US008212922B2

United States Patent
Momosaki et al.

(10) Patent No.: US 8,212,922 B2
(45) Date of Patent: Jul. 3, 2012

(54) INFORMATION DISPLAY APPARATUS, INFORMATION DISPLAY METHOD AND PROGRAM THEREFOR

(75) Inventors: Kohei Momosaki, Kawasaki (JP); Kazuhiko Abe, Yokohama (JP); Yasuyuki Masai, Yokohama (JP); Makoto Yajima, Tachikawa (JP); Koichi Yamamoto, Kawasaki (JP); Munehiko Sasajima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1296 days.

(21) Appl. No.: 11/861,995

(22) Filed: Sep. 26, 2007

(65) Prior Publication Data

US 2008/0025698 A1    Jan. 31, 2008

Related U.S. Application Data

(63) Continuation of application No. 10/810,648, filed on Mar. 29, 2004, now Pat. No. 7,443,449.

(30) Foreign Application Priority Data

Mar. 31, 2003   (JP) .................................. 2003-095402

(51) Int. Cl.
*H04N 7/01*   (2006.01)
*G10L 21/04*   (2006.01)

(52) U.S. Cl. ........................................ 348/468; 704/211

(58) Field of Classification Search .......... 348/461–468; 704/235, 244, 211, 270
See application file for complete search history.

(56) References Cited

U.S. PATENT DOCUMENTS

| 5,481,296 | A   |   | 1/1996  | Cragun et al. |
| 5,561,457 | A   | * | 10/1996 | Cragun et al. ................ 725/137 |
| 5,657,088 | A   | * | 8/1997  | Hankinson ..................... 348/465 |
| 5,703,655 | A   | * | 12/1997 | Corey et al. .................... 348/468 |
| 6,396,544 | B1  | * | 5/2002  | Schindler et al. ............. 348/461 |
| 6,505,153 | B1  | * | 1/2003  | Van Thong et al. ........... 704/211 |
| 6,542,200 | B1  | * | 4/2003  | Barcy et al. .................... 348/468 |
| 6,972,802 | B2  | * | 12/2005 | Bray ............................... 348/468 |
| 7,013,273 | B2  | * | 3/2006  | Kahn .............................. 704/235 |
| 7,139,031 | B1  | * | 11/2006 | Bray ............................... 348/468 |
| 7,443,449 | B2  | * | 10/2008 | Momosaki et al. ............ 348/468 |
| 2002/0101537 | A1 |   | 8/2002 | Basson et al. |

FOREIGN PATENT DOCUMENTS

| JP | 7-46500    | 2/1995 |
| JP | 7-123376   | 5/1995 |
| JP | 7-226907   | 8/1995 |
| JP | 9-65295    | 3/1997 |
| JP | 10-243315  | 9/1998 |

OTHER PUBLICATIONS

Office Action mailed on Nov. 30, 2010, in Japanese Patent Application No. 2007-210922 (with English Translation).

* cited by examiner

*Primary Examiner* — Paulos Natnael
(74) *Attorney, Agent, or Firm* — Oblon, Spivak, McClelland, Maier & Neustadt, L.L.P.

(57) ABSTRACT

An information display apparatus includes a display device configured to display a video, a speech detection unit configured to detect a playback state of a playback speech, a closed caption display unit configured to generate character information associated with the playback speech and display it on the display device together with the video, and a closed caption display unit configured to carry out a changing control for changing according to the detected playback state a display state of the character information that is displayed on the display device by the closed caption display unit.

7 Claims, 8 Drawing Sheets

| Rule | Speech level | Ambient noise |
|---|---|---|
| 1 | ▽ | |
| 2 | ▼ | ※ |
| 3 | | △ |

▽ : Display closed caption in less than given level
▼ : Display closed caption in less than reference level based on ※
△ : Display closed caption in not less than the given level

| Rule | Speech level | Ambient noise | Playback sound volume | Playback speed | Sound multiplex |
|---|---|---|---|---|---|
| 1 | ▽ | | | | |
| 2 | ▼ | ※ | | | |
| 3 | | △ | | | |
| 4 | | | | ◇ | |
| 5 | | | | Reverse | |
| 6 | | | | Pause | |
| 7 | | | ▽ | | |
| 8 | | ※ | ▼ | | |
| 9 | | | | | Sub-speech |

△ : ※Display closed caption in not less than given level
▽ : Display closed caption in less than given level
◇ : Display closed caption outside given range
▼ : Display closed caption in less than reference level based on ※

INFORMATION DISPLAY APPARATUS, INFORMATION DISPLAY METHOD AND PROGRAM THEREFOR

CROSS-REFERENCE TO RELATED APPLICATIONS

This application is a continuation of and claims the benefit of priority under 35 U.S.C. §120 from U.S. application Ser. No. 10/810,648, filed Mar. 29, 2004, the entire contents of which are incorporated herein by reference. This application also claims the benefit of priority under 35 U.S.C. §119 from the prior Japanese Patent Application No. 2003-095402, filed Mar. 31, 2003, the entire contents of which are incorporated herein by reference.

BACKGROUND OF THE INVENTION

1. Field of the Invention

The present invention relates to an information display apparatus which is incorporated in or connected to a video playback apparatus or video recorder/player apparatus represented by a television receiver, DVD apparatus, or hard disk video recorder and provides a closed caption display function, an information display-method, and a program.

2. Description of the Related Art

Television broadcasts and DVD video contents provide closed caption information that supplements speech information. In a television broadcast, teletext signals are superposed on video signals. More specifically, character information is transmitted using an identification signal (VBI signal> inserted during a vertical blanking period (see, e.g., Japanese Patent Laid-Open No. 9-65295). DVDs and the like are so designed as to record multilingual closed caption information together with images and speech. Digital high-definition television broadcasts can also transmit closed captions as sub-video information.

The use of closed caption character information is effective not only for a hearing impaired person and deaf person but also for a normal listener when it is hard to hear speech corresponding to an image (for example, when the playback sound volume is small or ambient noise is large). This is also effective when it is difficult to play back speech corresponding to an image so as to be able to hear it (for example, in high speed playback such as fast-forward playback while displaying an image, slow-motion replay, pause, backward playback, or multi-screen display).

However, a conventional video playback apparatus or information display apparatus does not provide closed caption character information display functions corresponding to viewing situations. A technique of displaying a closed caption in a mute state has also been known (see, e.g., Japanese Patent Laid-Open No. 7-46500). No conventional video playback apparatus or information display apparatus provides a function of controlling display of closed caption character information in accordance with the viewing situation.

It is an object of the present invention to provide an information display apparatus capable of controlling display of closed caption character information in accordance with a viewing situation, and an information display method therefor. In playing back an image by a television receiver, video playback apparatus, video recorder/player apparatus, or the like, or playing back speech by a speech playback apparatus, speech recorder/player apparatus, or the like, closed caption character information is displayed or the display form is changed in accordance with the speech playback status to appropriately supplement speech information in, e.g., a situation in which it is probably impossible or hard to hear or understand speech.

BRIEF SUMMARY OF THE INVENTION

According to an aspect of the present invention, there is provided an information display apparatus comprising: a display device configured to display a video; a speech detection unit configured to detect a playback state of a playback speech; a closed caption display unit configured to generate character information associated with the playback speech and display it on the display device together with the video; and a closed caption display unit configured to carry out a changing control for changing according to the detected playback state a display state of the character information that is displayed on the display device by the closed caption display unit.

According to another aspect of the present invention, there is provided an information display method comprising: generating a playback speech; detecting a playback state of the playback speech; and changing a display state of character information associated with the playback speech according to the detected playback state.

According to another aspect of the present invention, there is provided a program stored in a computer readable medium for displaying character information on a display device, comprising: means for instructing a computer to playback a video and a speech from a recording medium; means for instructing the computer to change a playback state of the video and the speech; means for instructing the computer to display character information associated with the video and the speech; and means for instructing the computer to change a display state of the character information according to the display state of the video and the speech.

According to the present invention, when an image is played back by a television receiver, video playback apparatus, video recorder/player apparatus, or the like, or speech is played back by a speech playback apparatus, speech recorder/player apparatus, or the like. Closed caption character information is displayed or the display form is changed in accordance with the speech playback status to appropriately supplement speech information in, e.g., a situation in which it is probably impossible or difficult to hear or understand speech. In this manner, display of closed caption character information can be controlled in accordance with the viewing situation. For example, when speech does not satisfy conditions which are set in advance as a state in which the speech can be properly heard, closed caption information which supplements the speech information can be properly displayed, or the display form can be appropriately changed.

DETAILED DESCRIPTION OF THE INVENTION

Preferred embodiments of the present invention will be described in detail below with reference to the several views of the accompanying drawing.

First Embodiment

An information display apparatus according to the first embodiment of the present invention is used while being connected to an apparatus that receives information such as a broadcast containing video data, speech data, and closed caption character information data. Closed caption character information may be given as data separated from an image and speech, superposed in a video signal and transmitted, or received as a sub-image.

Figures 1, 2:
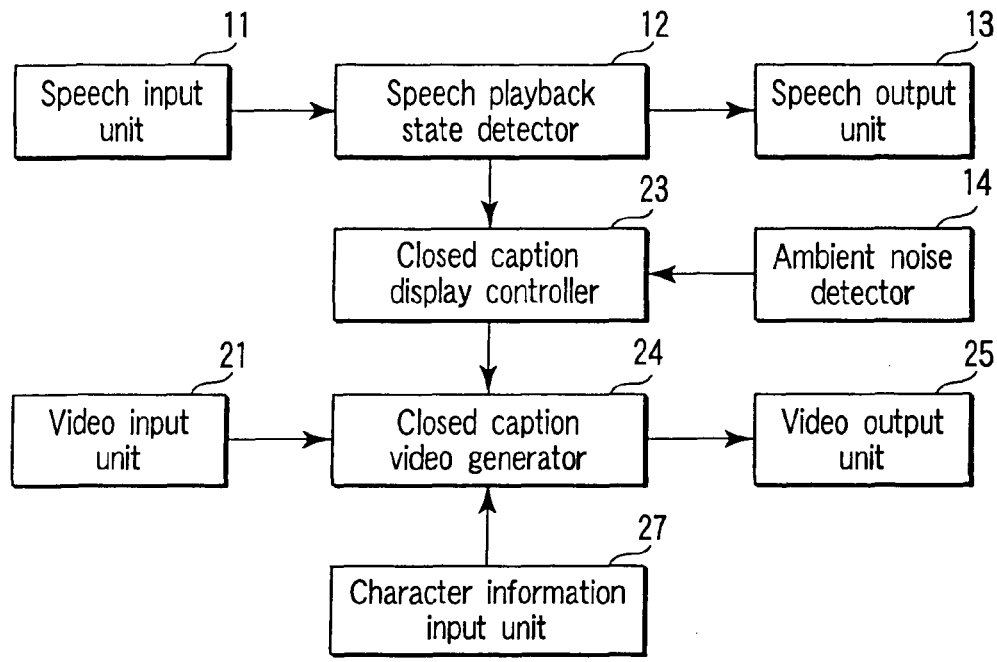
FIG. 1 is a block diagram of an information display apparatus according to the first embodiment of the present invention.
FIG. 2 is a diagram showing an example of a process rule in a closed caption display controller of the embodiment.

FIG. 1 shows an example of the arrangement of the information display apparatus according to the first embodiment.

As shown in FIG. 1, the information display apparatus according to the first embodiment comprises a speech input unit 11 which inputs a speech signal, a speech playback state detector 12 which processes an input speech signal and detects a speech output state, a speech output unit 13 which outputs an input speech signal, an ambient noise detector 14 which detects an ambient noise level, a video input unit 21 which inputs a video signal, a character information input unit 27 which inputs closed caption character information, a closed caption display controller 23 which controls display of input closed caption character information, a closed caption video generator 24 which generates a video signal displaying a closed caption on the basis of an input video signal, input closed caption character information, and character font data, and a video output unit 25 which outputs a video signal generated by the closed caption video generator 24. The character information input unit 27 may be input the closed caption character information corresponding a speech by key-in or conventional speech recognition. When no closed caption is displayed, the closed caption video generator 24 outputs a video signal without displaying any closed caption. Character font data may also be installed in the closed caption video generator 24.

The speech playback state detector 12 monitors the sound volume of a speech signal input to the speech input unit 11. The sound volume can be monitored depending on the maximum power per a given time or the like. The speech playback state detector 12 can also be configured to detect whether the sound volume of a speech signal is 0.

The ambient noise detector 14 receives ambient noise via a microphone, and detects the loudness of noise. The microphone is so arranged as not to be influenced by a speech output from the speech output unit 13, or as to estimate any ambient sound other than playback speech by referring to a speech signal input to the speech input unit 11. A microphone may detect noise at the viewer position with directivity.

In accordance with the sound volume of a speech signal detected by the speech playback state detector 12 and the loudness of ambient noise detected by the ambient noise detector 14, the closed caption display controller 23 controls the closed caption video generator 24 by selecting the show or hide state of a closed caption in accordance with at least one of three rules shown in FIG. 2:

"Rule 1: display a closed caption when the speech signal is silent or it is in less than a given level"

"Rule 2: display a closed caption when the speech signal is in less than a reference level determined in accordance with the ambient noise level"

"Rule 3: display a closed caption when the ambient noise level is in not less than the given level"

If two or more of these rules are used, the hide state is selected only when the situation doe not correspond to all of the rules. When even one rule corresponds to the situation, the display state is selected.

As a sequence of determining whether each rule corresponds to the situation, for example, rules are extracted one by one to check whether the rule corresponds to the situation. When at first the rule corresponding to the situation is found, the display state is selected to end the sequence. When the rule corresponding to the situation cannot be found upon checking all of the rules, the hide state is selected to end the sequence.

In the above example, according to the rules 1 and 2, a closed caption is properly displayed in correspondence with the level of difficulty in hearing due to a weak speech signal. When these processes are not executed, the speech playback state detector 12 can be omitted. In the absence of the speech playback state detector 12, the speech input unit 11 is directly connected to the speech output unit 13.

According to the rules 2 and 3, a closed caption is appropriately displayed in correspondence with the difficulty in hearing due to an ambient noise. When these processes are not executed, the ambient noise detector 14 can be omitted.

For example, when the sound volume is turned down on the television tuner side, it is hard to hear and understand the contents of a talk though a laughing voice or the like can be heard. Also, when ambient noise becomes loud, e.g., the telephone starts ringing, it becomes difficult to hear the television speech. However, the television speech can be heard even in a noisy environment by turning up the sound volume of the television.

Figure 3A:
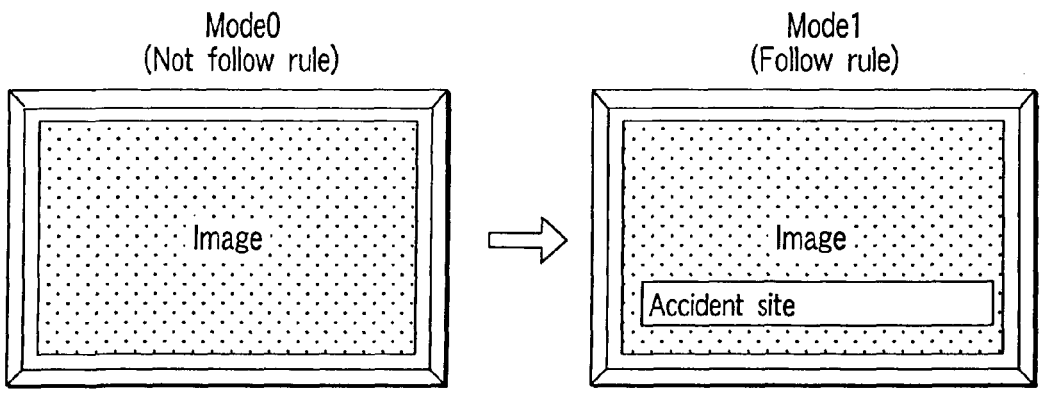
FIGS. 3A to 3D are diagrams showing an example of control of a closed captions display in the embodiment.

The first embodiment automatically displays a closed caption in such situation in which it is hard to hear speech, allowing the viewer to understand the contents. FIG. 3A illustrates a state in which the no-closed caption display state automatically changes to the closed caption display state.

The reference level and the parameters of the function are preferably set for each viewer who watches a program. For example, an elderly viewer may set the reference level of the speech signal slightly higher than that for a young viewer. For a viewer who watches a program using a headphone or earphone, the reference level of ambient noise may be set high or the influence of ambient noise on each reference level may be reduced.

Figure 3B:
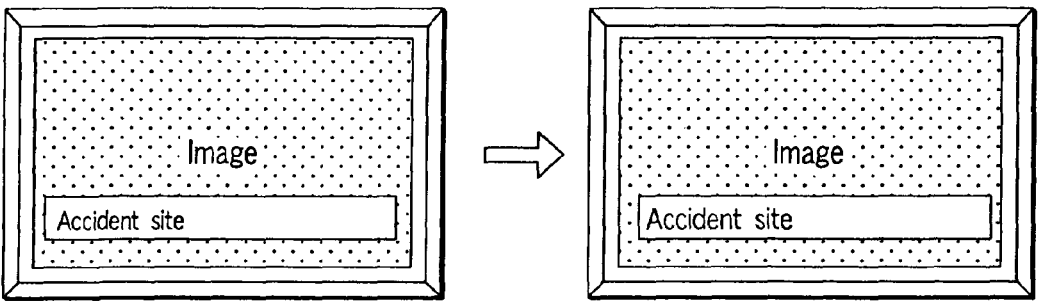
Figure 3C:
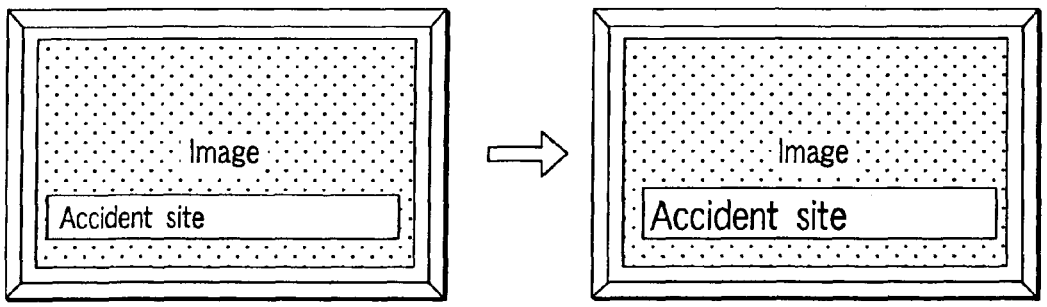
Figure 3D:
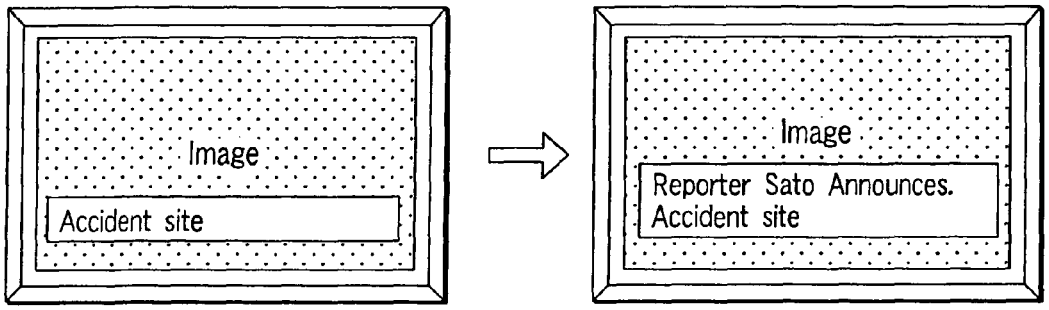

In general, information supplementation by a closed caption is not so necessary for a normal listener. Even in the closed caption display state, the character size is set smaller than a normal one. The character size may be changed to a normal one in accordance with the closed caption display control condition, as shown in FIG. 3B, or set larger than a normal one, as shown in FIG. 3C. The number of lines may also be increased, as shown in FIG. 3D.

Subtitle display control depending on the speech condition is not effective for a hearing impaired person. Thus, a mode in which a closed caption is displayed is always set selectable in accordance with the viewer.

Figure 4:
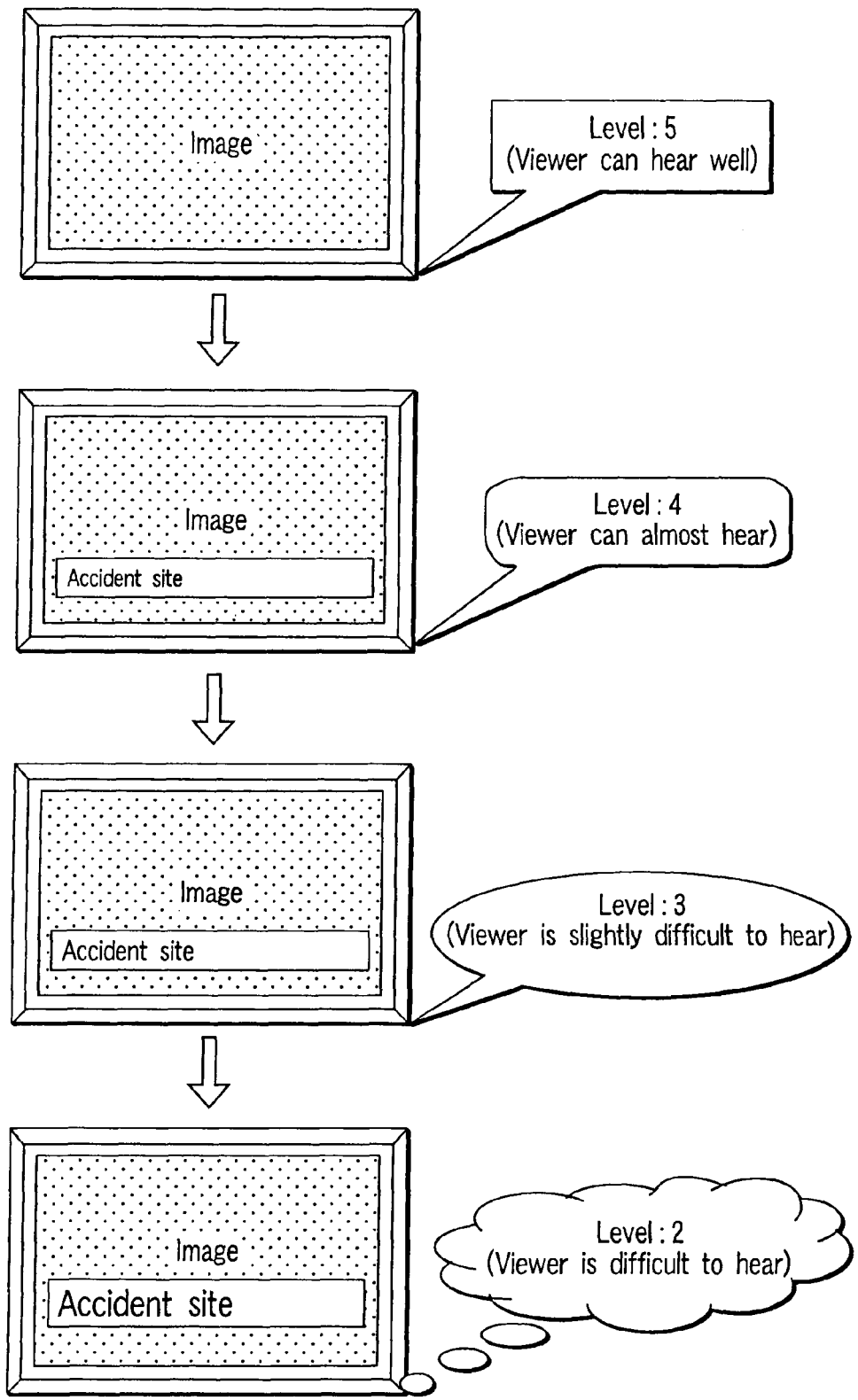
FIG. 4 is a diagram showing another example of control of a closed caption display in the embodiment.

The difficulty in hearing may be evaluated in several stages by setting a plurality of reference levels for each condition. The degrees of difficulty in hearing may be made to correspond to respective operations by using the maximum value of a difficulty value, as shown in FIG. 4.

The information display apparatus according to the first embodiment can be so connected as to process an input from a television tuner on the input stage of an amplifier or the like which controls the sound volume. Also, the information display apparatus can be so connected as to process an output signal having undergone sound volume control by the amplifier or the like, or a signal for driving the loudspeaker. In this case, the sound volume control state is reflected, and actual difficulty in hearing a speech can be further reflected.

The rules 1 to 3 can be given by other equivalent expressions. For example, the rule 3 may be expressed by "display a closed caption when the ambient noise level is not in less than the given level". This also applies to the remaining rules.

The rules 1 to 3 define conditions to display a closed caption. A closed caption is displayed when even one of the conditions is satisfied, and is not displayed when no condition is satisfied. To the contrary, the rules may define conditions not to display a closed caption. A closed caption is not displayed when all the conditions are satisfied, and is displayed when even one condition is not satisfied. These rules and functions are merely an example, and can be variously changed. All (or some) of the above-mentioned functions may be adopted to allow the viewer to arbitrary set which of the functions is to be used.

Second Embodiment

An information display apparatus according to the second embodiment of the present invention is realized by assembling it in an apparatus which reads out and plays back data from a recording medium such as a DVD that records video data, speech data, and closed caption character information data.

Figures 5, 6:
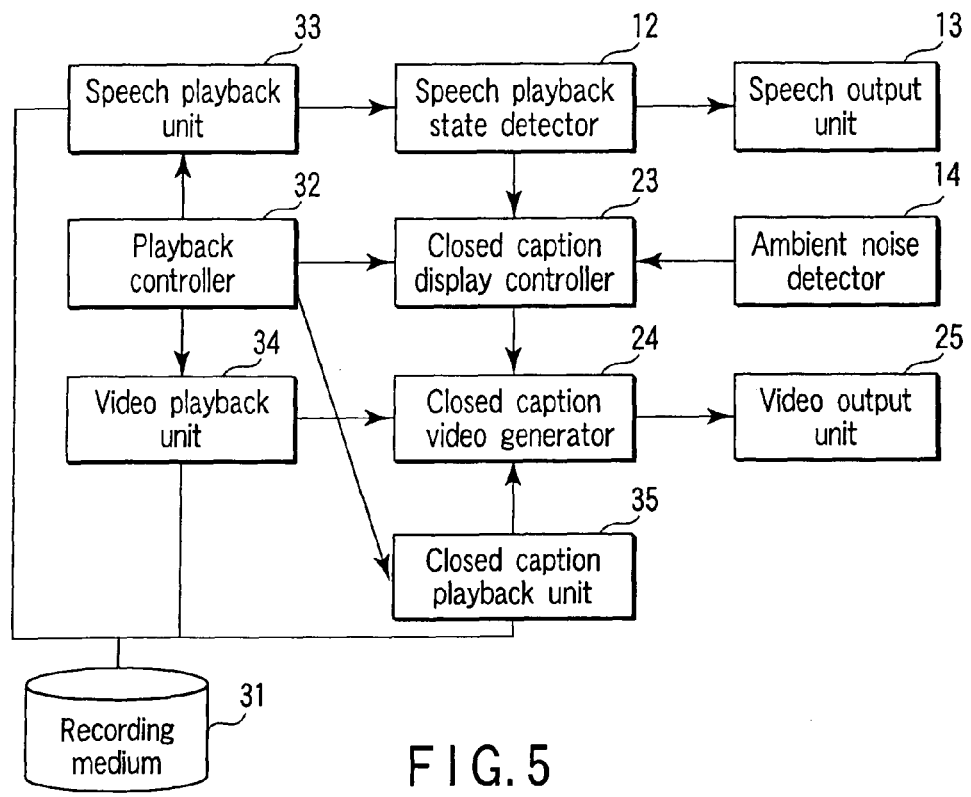
FIG. 5 is a block diagram of an information display apparatus according to the second embodiment of the present invention.
FIG. 6 is a diagram showing an example of a process rule in a closed caption display control unit of the embodiment.

FIG. 5 shows an example of the arrangement of the information display apparatus according to the second embodiment.

As shown in FIG. 5, the information display apparatus according to the second embodiment comprises a recording medium 31 which records video data, speech data, and closed caption character information data, a playback controller 32 which controls read and playback of the recording medium, a speech playback unit 33 which reads out speech data from the recording medium 31, a speech playback state detector 12 which processes speech data and detects a speech output state, a speech output unit 13 which outputs speech data as a speech signal, an ambient noise detector 14 which detects an ambient noise level, a video playback unit 34 which reads out video data from the recording medium 31, a closed caption playback unit 35 which reads out closed caption character information data from the recording medium 31, a closed caption display controller 23 which controls display of read closed caption character information data, a closed caption video generator 24 which generates a video signal displaying a closed caption on the basis of read video data, read closed caption character information data, and character font data, and a video output unit 25 which outputs a generated video signal with superimposed closed caption.

The speech playback state detector 12, speech output unit 13, ambient noise detector 14, closed caption video generator 24, and video output unit 25 are basically the same as those in the first embodiment.

The playback controller 32 controls the playback state and playback sound volume in accordance with viewer operation via an operation panel, remote controller, or the like. The playback controller 32 reads out, plays back, and outputs video information, speech information, and closed caption information.

In accordance with the sound volume of a speech signal detected by the speech playback state detector 12, the loudness of ambient noise detected by the ambient noise detector 14, and the playback state and playback sound volume of the playback controller 32, the closed caption display controller 23 controls the closed caption video generator 24 by selecting the show or hide state of a closed caption in accordance with at least one of nine rules shown in FIG. 6:

"Rule 1: display a closed caption when the speech signal is silent or is in less than a given level"

"Rule 2: display a closed caption when the speech signal is in less than a reference level determined in accordance with the ambient noise level"

"Rule 3: display a closed caption when the ambient noise level is in not less than the given level"

"Rule 4: display a closed caption when the playback state is forward playback other than real-time playback"

"Rule 5: display a closed caption when the playback state is backward playback"

"Rule 6: display a closed caption when the playback state is pause"

"Rule 7: display a closed caption when the playback sound volume is muted (sound deadening) or is in less than a given level"

"Rule 8: display a closed caption when the playback sound volume is in less than a reference level determined in accordance with the ambient noise level"

"Rule 9: display a closed caption when the playback state is a state in which a speech channel other than the main speech is output"

If a plurality of rules are utilized, the hide state is selected when all the rules result in the hide state.

When the rules 2, 3, and 8 are not adopted, the ambient noise detector 14 can be omitted. When the rules 1 and 2 are not applied, the speech playback state detector 12 can be omitted.

Instead of applying the rules 4 to 6 to selection of the closed caption display state in the closed caption display controller 23, the playback speech may be muted (sound deadening) in the closed caption display controller 23 when any of these three rules is satisfied. In this case, the speech playback state detector 12 detects that the playback speech does not generate any sound, and the rule 1 is applied, obtaining the same effects.

Figure 7:
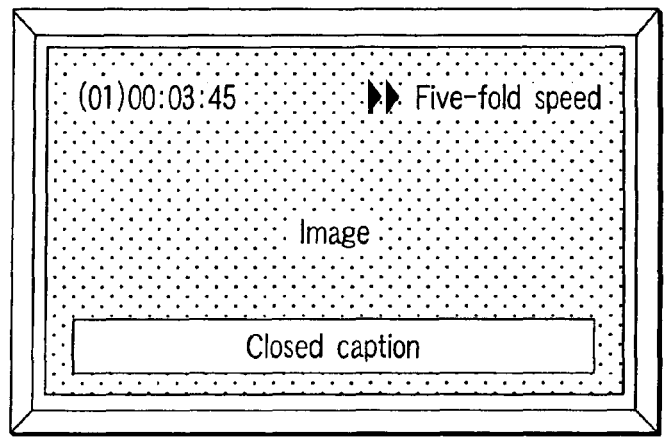
FIG. 7 is a diagram showing an example of display on the screen in the embodiment.

A rule "display a closed caption in a playback state other than forward real-time playback" may be employed in place of the rules 4 to 6. For example, the rule 4 can display a closed caption as shown in FIG. 7 during fast-forward playback at a five-fold speed.

For example, when the sound volume of DVD video is turned down, it is difficult to hear and understand the contents of a talk though a laughing voice or the like can be heard. Also, when ambient noise becomes loud, e.g., the telephone starts ringing, it becomes difficult to hear the speech of DVD video. However, the speech of the DVD video can be heard even in a noisy environment by turning up the playback sound volume. The sound volume may be determined from a speech signal, or control information of the DVD video apparatus.

In special playback such as two-fold-speed playback, it is difficult to play back speech so as to easily hear it. If the time axis is directly shortened, the speech pitch changes. Even use of a speech speed conversion technique of prolonging/shortening the time without changing the pitch, prolongation/shortening by about 50% or more makes hearing difficult. Prolongation/shortening by about 20% hardly makes hearing difficult, and even special playback can be regarded as real-time playback. From this, a condition to determine "not real-time playback" in the rule 4 may be defined as, for example, "playback with speech at a speed of 0.8 fold or less or 1.2 fold or more".

Generally in backward (rewind) playback, speech cannot be discerned even by real-time playback. In general playback control, the speech synchronized with an image cannot be output during a pause.

When a plurality of speech channels such as a bilingual multiplex broadcast are provided, one speech channel such as main speech or sub-speech is selected and output. When the sub-speech is selected, no main speech is output, and thus a closed caption often corresponding to the main speech is preferably displayed. Also when the main speech and sub-speech are assigned to, e.g., left and right channels and simultaneously output, the main speech is hard to heard, and its closed caption is preferably displayed.

When the language is designated to select a speech channel, the viewer can easily understand his/her native language, but may find it difficult to understand another language. In this case, a closed caption corresponding to the language of the speech is desirably displayed. Alternatively, the viewer's native language is selected and set, and when a speech channel other than the native language is selected, the closed caption of the viewer's native language is preferably displayed.

According to the second embodiment, a closed caption can be automatically displayed in such situation in which it is hard to hear speech, allowing the viewer to understand the contents.

Figure 8:
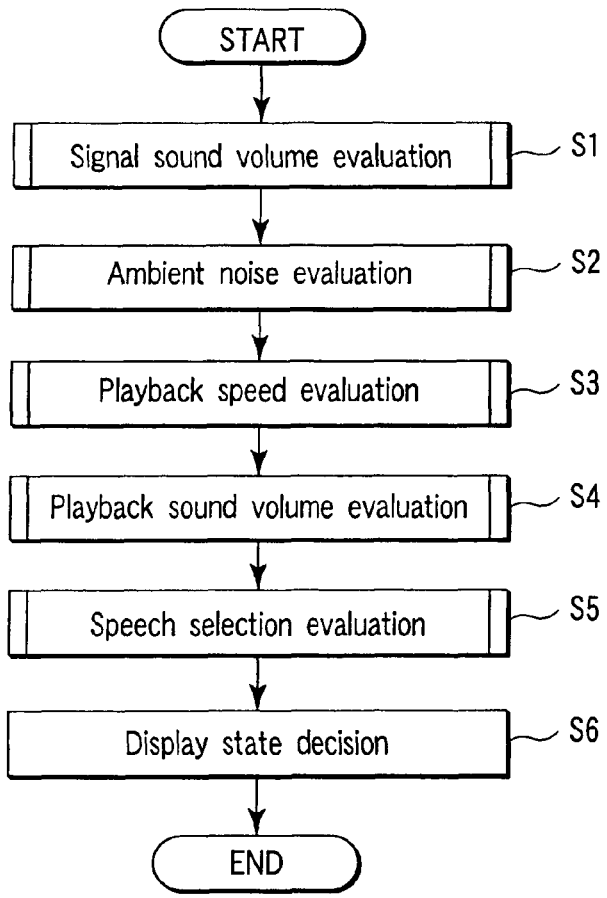
FIG. 8 is a flow chart showing an example of a flow of a process in a closed caption display control unit of the embodiment.

The processing flow in the closed caption display controller 23 will be explained with reference to the flow chart of FIG. 8.

The sound volume of a speech signal detected in the speech playback state detector 12 is evaluated (rules 1 and 2), and a closed caption display operation mode is set (step S1). The loudness of ambient noise detected in the ambient noise detector 14 is evaluated (rule 3), and a closed caption display operation mode is set (step S2). Of playback states held in the playback controller 32, the playback speed is evaluated (rules 4 to 6), and a closed caption display operation mode is set (step S3). The playback sound volume held in the playback controller 32 is evaluated (rules 7 and 8), and a closed caption display operation mode is set (step S4).

A speech channel to be selected out of multiple speech channels held in the playback controller 32 is evaluated (rule 9), and a closed caption display operation mode is set (step S5). The closed caption display state is determined in accordance with a mode in which it is hardest to hear speech, out of the closed caption display operation modes in the respective steps, and closed caption display is controlled (step S6).

Figure 9:
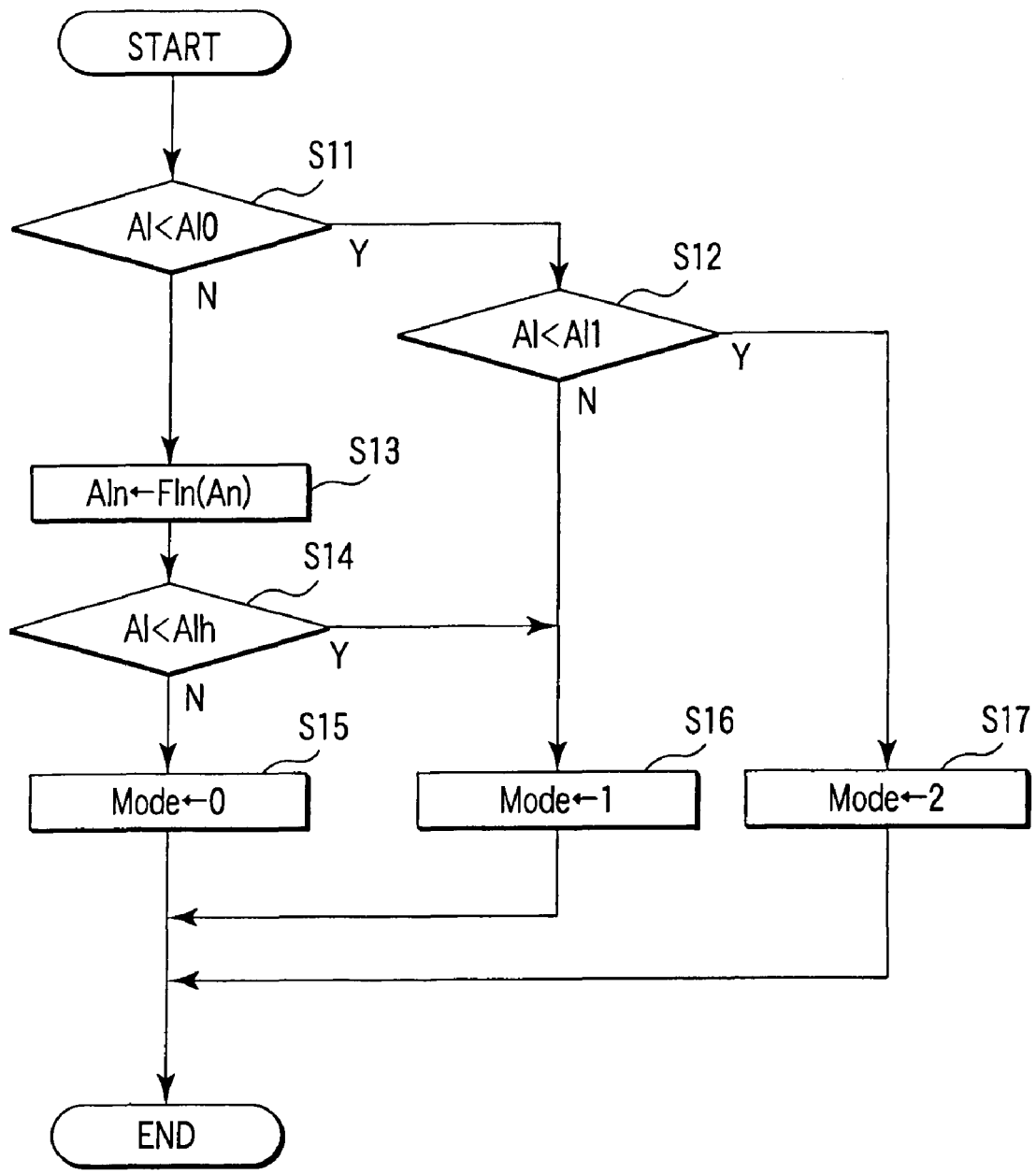
FIG. 9 is a flow chart showing an example of a flow of a detailed process in step S1 of FIG. 8.

A detailed processing flow in step S1 will be described with reference to the flow chart of FIG. 9.

A speech signal level A1 is compared with the first reference level A10 set in advance (step S11). If A1 is lower, A1 is compared with the second reference level A11 set in advance (step S12). If A1 is lower, (rule 1) closed caption display operation mode 2 is set (step S17). If A1 is higher than or equal to A11 in step S12, (rule 1) closed caption display operation mode 1 is set (step S16).

A reference level $F1n$ (An) determined in accordance with loudness An of ambient noise is calculated (step S13), and compared with the speech signal level A1 (step S14). If A1 is lower, (rule 2) closed caption display operation mode 1 is set (step S16). If no condition is satisfied, closed caption display operation mode 0 is set (step S15).

Figure 10:
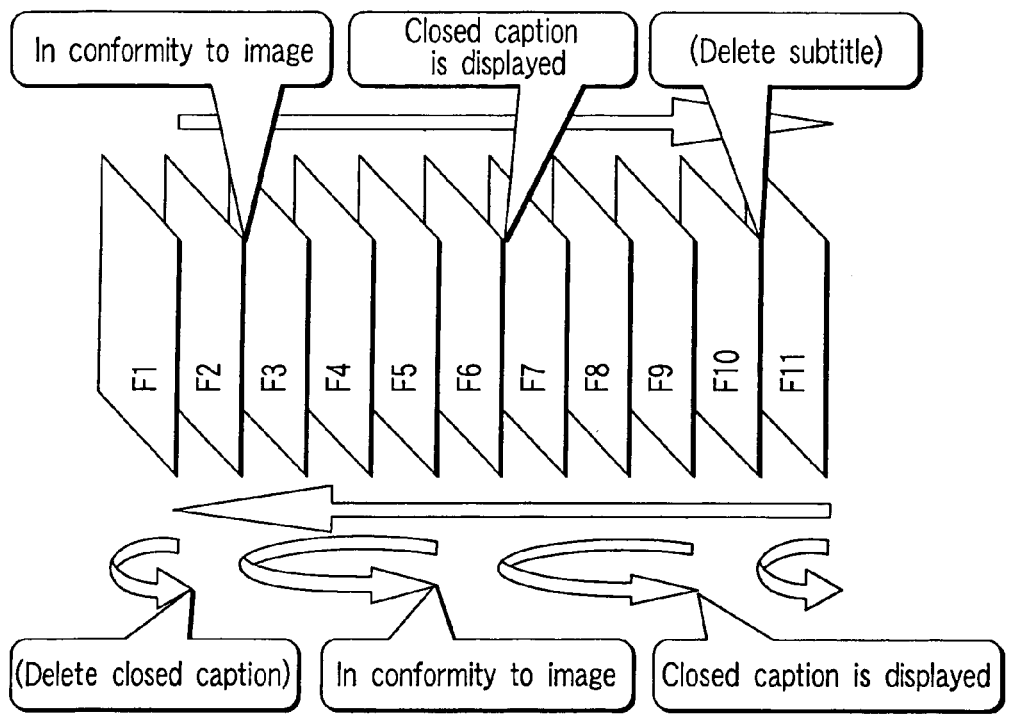
FIG. 10 is a diagram showing an example of a closed caption display method at the time of a reverse playback in the embodiment.

A closed caption display method in backward playback will be explained with reference to an example in FIG. 10.

In this example, pieces of video information of frames F1 to F11, and pieces of speech information synchronized in time are provided. "In sync with image" is added to or embedded in the frame F2. "Subtitle is displayed" is added to or superposed in the frame F6. Subtitle information "delete closed caption" is added to or superposed in the frame F10.

In forward playback, frames are sequentially played back from the frames F1 to F11. The closed caption "in sync with image" is displayed from F2 to F5, and the closed caption "closed caption is displayed" is displayed from the frames F6 to F9. In backward playback, the frames are played back in the reverse order from the frames F11 to F1. The frames are searched in the reverse order from the frame F11 for a frame containing closed caption information. If closed caption deletion information is found in the frame F10, the frames F11 and F10 are displayed without any closed caption. The frames are searched in the reverse order from the frame F9 for a frame containing closed caption information. If closed caption information "closed caption is displayed" is found in the frame F6, the frames F9, F8, F7, and F6 are displayed with the closed caption "closed caption is displayed".

The frames are searched in the reverse order from the frame F5 for a frame containing closed caption information. If closed caption information "in sync with image" is found in the frame F2, the frames F5, F4, F3, and F2 are displayed with the closed caption "in sync with image". No preceding frame containing closed caption information exists before the frame F1, thus the closed caption is deleted, and the frame F1 is displayed.

The rules 1 to 9 can be represented by other equivalent expressions. For example, the rule 5 may be expressed by "display a closed caption when the playback state is not forward playback, pause, or stop". This also applies to the remaining rules.

The rules 1 to 9 define conditions to display a closed caption. A closed caption is displayed when even one of the conditions is satisfied, and is not displayed when no condition is satisfied. To the contrary, the rules may define conditions not to display a closed caption. A closed caption is not displayed when all the conditions are satisfied, and is displayed when even one condition is not satisfied.

These rules and functions are merely an example, and can be variously changed. All (or some) of the above-mentioned functions may be employed to allow the viewer to arbitrary set which of the functions is to be used.

Third Embodiment

An information display apparatus according to the third embodiment of the present invention is used while being connected to an apparatus which reads out and plays back data from a recording medium such as a DVD recording video data, speech data, and closed caption character information data. Subtitle character information may be given as data different from an image and speech, or superposed in a video signal and recorded.

Figure 11:
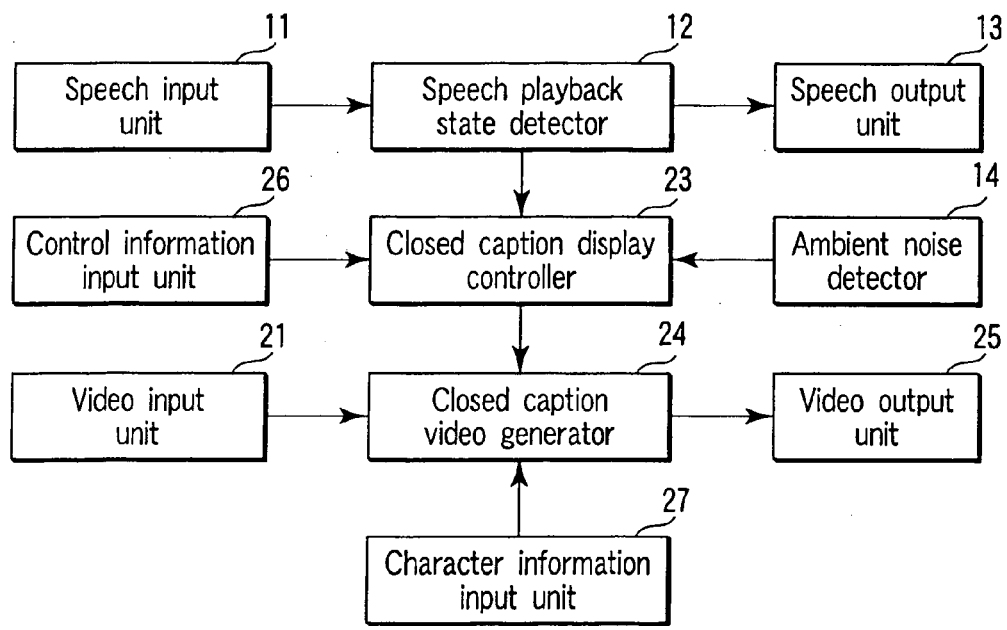
FIG. 11 is a block diagram of an information display apparatus according to the third embodiment of the present invention.

FIG. 11 shows an example of the arrangement of the information display apparatus according to the third embodiment. As shown in FIG. 11, the information display apparatus according to the third embodiment comprises a speech input unit 11 which inputs a speech signal, a speech playback state detector 12 which processes an input speech signal and detects a speech output state, a speech output unit 13 which outputs an input speech signal, an ambient noise detector 14 which detects an ambient noise level, a control information input unit 26 which inputs playback control information of an image or the like, a video input unit 21 which inputs a video signal, a character information input unit 27 which inputs closed caption character information, a closed caption display controller 23 which controls display of input closed caption character information, a closed caption video generator 24 which generates a video signal displaying a closed caption on the basis of an input video signal, input closed caption character information, and character font data, and a video output unit 25 which outputs a generated video signal of a closed caption.

The speech input unit 11, speech playback state detector 12, speech output unit 13, ambient noise detector 14, video input unit 21, character information input unit 27, closed caption video generator 24, and video output unit 25 are basically the same as those in the first and second embodiments.

The control information input unit 26 inputs playback state information and playback sound volume information which are controlled in accordance with viewer operation via an operation panel, a remote controller, or the like in an apparatus which plays back an image or the like from a recording medium.

In accordance with the sound volume of a speech signal detected by the speech playback state detector 12, the loudness of ambient noise detected by the ambient noise detector 14, and playback state information and playback sound volume information which are input to the control information input unit 26, the closed caption display controller 23 controls the closed caption video generator 24 by selecting the show or hide state of a closed caption in accordance with, e.g., at least one of the nine rules described in the second embodiment. If a plurality of rules are utilized, the hide state is selected when all the rules exhibit the hide state.

The information display apparatus according to the third embodiment can be so configured as to receive information on the operation state of a DVD recorder/player apparatus or the like and input the information to the control information input unit 26. The information display apparatus may receive a remote control signal (infrared signal, radio signal, or the like) for operating the DVD recorder/player apparatus or the like, and then operate.

The information display apparatus according to the third embodiment can be so connected as to process an input from the DVD recorder/player apparatus or the like on the input stage of an amplifier or the like which controls the sound volume. Also, the information display apparatus can be so connected as to process an output signal having undergone sound volume control by the amplifier or the like, or a signal for driving the loudspeaker. In this case, the sound volume control state is reflected, and actual difficulty in hearing speech can be further reflected.

The above-described rules and functions are merely an example, and can be variously changed. All (or some) of the functions may be adopted to allow the viewer to arbitrary set which of the functions is to be used.

Fourth Embodiment

An information display apparatus according to the fourth embodiment of the present invention is realized by assembling it in an apparatus which receives information of a broadcast or the like containing video data, speech data, and closed caption character information data. Subtitle character information may be given as data different from an image and speech, superposed in a video signal and transmitted, or received as a sub-image.

Figure 12:
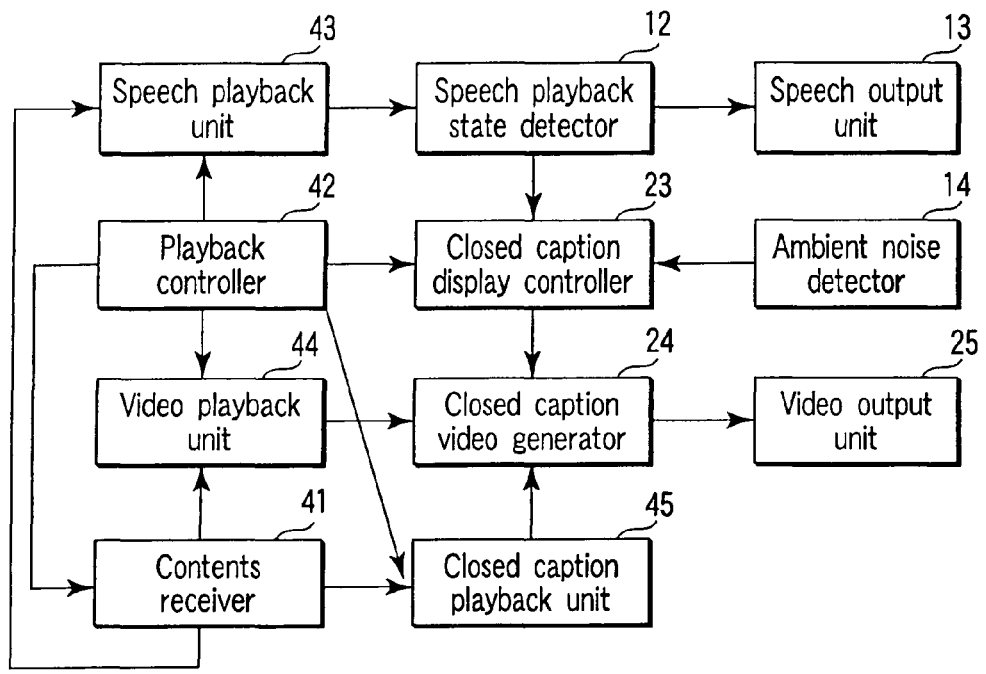
FIG. 12 is a block diagram of an information display apparatus according to the fourth embodiment of the present invention.

FIG. 12 shows an example of the arrangement of the information display apparatus according to the fourth embodiment. As shown in FIG. 12, the information display apparatus according to the fourth embodiment comprises a contents receiver 41 which receives contents of a broadcast or the like transmitted via radio waves, a cable, or the like, a speech playback unit 43 which extracts speech data from received information, a speech playback state detector 12 which processes an extracted speech signal and detects a speech output state, a speech output unit 13 which outputs an extracted speech signal, an ambient noise detector 14 which detects an ambient noise level, a video playback unit 44 which extracts video data from received information, a closed caption playback unit 45 which extracts closed caption character information data from received information, a closed caption display controller 23 which controls display of extracted closed caption character information, a closed caption video generator 24 which generates a video signal displaying a closed caption on the basis of an extracted video signal, input closed caption character information, and character font data, and a video output unit 25 which outputs a generated video signal of a closed caption.

The speech playback state detector 12, speech output unit 13, ambient noise detector 14, closed caption video generator 24, and video output unit 25 are basically the same as those in the first, second, and third embodiments. The playback controller 42 controls the playback state and playback sound volume in accordance with viewer operation via an operation panel, remote controller, or the like. The playback controller 42 reads out, plays back, and outputs video information, speech information, and closed caption information.

Figure 13:
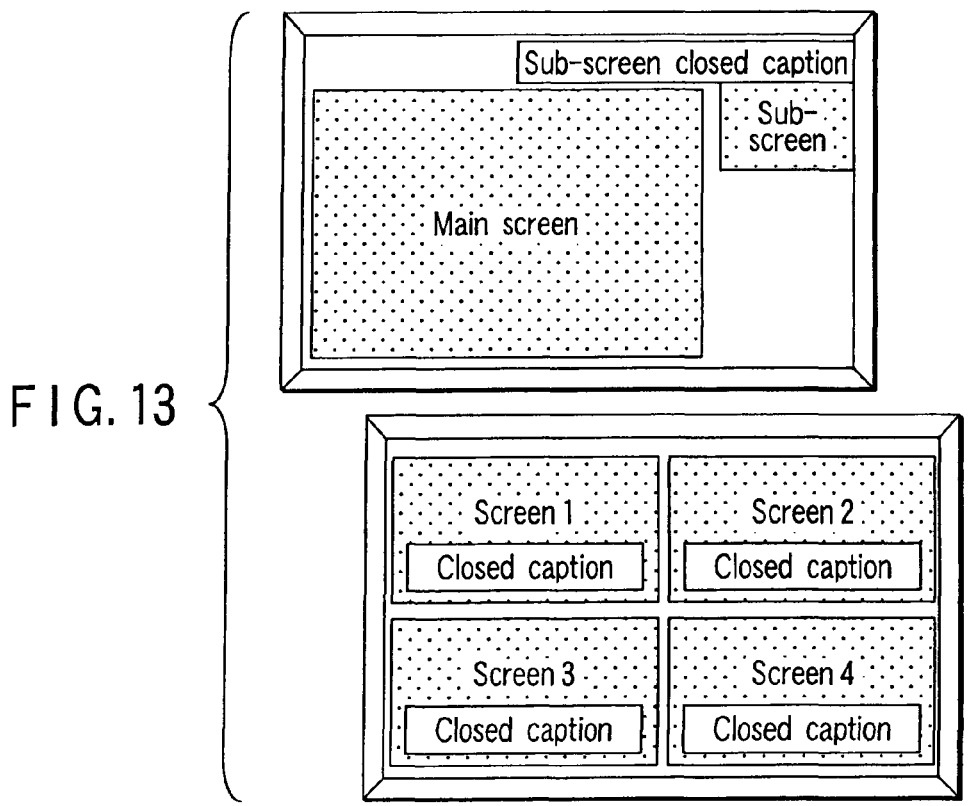
FIG. 13 is a diagram showing an example of division display of a screen in the embodiment.

When the information display apparatus is equipped with a function of receiving contents transmitted via a plurality of channels in parallel with each other, splitting the screen into, for example, four screen sections as shown in FIG. 13, and displaying the contents, the playback controller 42 also controls the screen display state in accordance with viewer operation. The playback controller 42 further controls to select one of contents on the display windows and play back a speech.

In accordance with the sound volume of a speech signal detected by the speech playback state detector 12, the loudness of ambient noise detected by the ambient noise detector 14, and the playback state, playback sound volume, and screen split state of the playback controller 42, the closed caption display controller 23 controls the closed caption video generator 24 by selecting the show or hide state of a closed caption in accordance with at least one of four rules:

"Rule 1: display a closed caption when the speech signal is silent or is it is in less than a given level"

"Rule 2: display a closed caption when the speech signal is in less than a reference level determined in accordance with the ambient noise level"

"Rule 3: display a closed caption when the ambient noise level is in not less than the given level"

"Rule 10: display a closed caption when screen display is multi-screen section display of a plurality of windows and no speech output is selected for the windows"

If a plurality of rules are utilized, the non-display state is selected when all the rules represent the non-display state.

When the rules 2 and 3 are not applied, the ambient noise detector 14 can be omitted. When the rules 1 and 2 are not executed, the speech playback state detector 12 can be omitted.

For example, when the playback sound volume of the television is turned down, it is difficult to hear and understand the contents of a talk though a laughing voice or the like can be heard. Also, when ambient noise becomes loud, e.g., the telephone starts ringing, it becomes difficult to hear the speech of the television. However, the speech of the television can be heard even in a noisy environment by turning up the sound volume of the television. The sound volume may be determined from a speech signal, or control information of the television or the like.

When contents are displayed on two or more windows upon reception of the contents from a plurality of broadcasting stations, it is difficult to simultaneously output speech sounds corresponding to these windows and hear them. In this case, subtitles corresponding to the respective windows are preferably displayed as shown in FIG. 13A. In general, each screen section is selected to output its speech without outputting sounds corresponding to the remaining screen sections. The screen sections other than the screen section selected to output the speech may display corresponding subtitles, as shown in FIG. 13B.

According to the fourth embodiment, a closed caption can be automatically displayed in such situation in which it is hard to hear speech, allowing the viewer to understand the contents.

The rules 1 to 3 and 10 define conditions to display a closed caption. A closed caption is displayed when even one of the conditions is satisfied, and is not displayed when no condition is satisfied. To the contrary, the rules may define conditions not to display a closed caption. A closed caption is not displayed when all the conditions are satisfied, and is displayed when even one condition is not satisfied.

These rules and functions are merely an example, and can be variously changed. All (or some) of the above-mentioned functions may be employed to allow the viewer to arbitrarily set which of the functions is to be used. The above functions can also be implemented by writing them as software and processing them by a computer having a proper mechanism.

The above embodiments can also be executed as a program for causing a computer to execute a predetermined means, function as a predetermined means, or implement a predetermined function. In addition, the embodiments can be practiced as a computer-readable recording medium that records the program.

The present invention can control display of closed caption character information in accordance with the viewing situation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information display apparatus comprising:

a display device configured to display a video;

a speech detection unit configured to detect a playback state of a playback speech, the playback state including at least one of a sound volume of the playback speech and a playback speed;

a closed caption generating unit configured to generate a closed caption video comprising character information associated with the playback speech;

a closed caption display control unit configured to display the closed caption video on the display device and to change a display state of the closed caption video depending upon the playback state detected by the speech detection unit, wherein the closed caption display control unit changes the display state when the sound volume of the playback speech is not more than a given level, and the speech detection unit detects that the playback speech is silent, and inputs the playback speech having no audio output to the closed caption display control unit as the playback state, and the closed caption display control unit changes the display state when the playback state is a state that the playback speech is silent; and a playback unit configured to playback a video and a speech from a recording medium and a playback control unit configured to control the playback state of the speech and a playback state of the video, the playback control unit changing the display state by making the playback speech to be silent when the playback state is a playback state other than a normal forward playback.

2. The apparatus according to claim 1, which includes an ambient noise detection unit configured to detect a noise level of an ambient noise, and wherein the speech detection unit detects a sound volume of the playback speech and inputs it to the closed caption display control unit as the playback state, and the closed caption display control unit changes the display state when the sound volume of the playback speech is not more than a playback reference level determined by the noise level.

3. The apparatus according to claim 1, wherein the closed caption display control unit includes a plurality of conditions concerning the playback state and determines satisfaction of the conditions in comparison with the playback state at the present moment, and the closed caption display control unit changes the display state of the character information when either of the conditions is satisfied or all of them fail to be satisfied, or when neither of the condition is satisfied or all of them are satisfied.

4. The information display apparatus according to claim 1, which includes a speech selection unit configured to select a speech to be played back from a plurality of speeches including a main speech and a speech other than the main speech, the plurality of speech being associated with the video, and wherein the closed caption display control unit changes the display state of the character information when the speech other than the main speech is selected.

5. The information display apparatus according to claim 1, which includes a video language selection unit configured to select a language of the video and a speech selection unit configured to select a speech to be played back from a plurality of speeches associated with the video, and the closed caption display control unit changes the display state of the character information when a language concerning the speech selected by the speech selection unit differs from the language of the speech of the video selected by the video language selection unit.

6. The apparatus according to claim 1, wherein when the closed caption generating unit extracts the character information embedded in a television video signal, generates an image of a to-be-displayed closed caption based on the extracted character information, and outputs a video signal superimposing the image of the closed caption.

7. The apparatus according to claim 1, wherein when the closed caption generating unit generates an image of a to-be-displayed closed caption based on the character information corresponding to the speech information, and outputs a video signal superimposing the image of the closed caption.

* * * * *